United States Patent
Varadaraj

(10) Patent No.: US 7,419,939 B2
(45) Date of Patent: *Sep. 2, 2008

(54) MINERAL ACID ENHANCED THERMAL TREATMENT FOR VISCOSITY REDUCTION OF OILS (ECB-0002)

(75) Inventor: Ramesh Varadaraj, Flemington, NJ (US)

(73) Assignee: ExxonMobil Upstream Research Company, Houston, TX (US)

(*) Notice: Subject to any disclaimer, the term of this patent is extended or adjusted under 35 U.S.C. 154(b) by 505 days.

This patent is subject to a terminal disclaimer.

(21) Appl. No.: 10/869,513

(22) Filed: Jun. 16, 2004

(65) Prior Publication Data

US 2004/0222128 A1 Nov. 11, 2004

Related U.S. Application Data

(62) Division of application No. 09/819,269, filed on Mar. 28, 2001, now Pat. No. 6,800,193.

(60) Provisional application No. 60/199,565, filed on Apr. 25, 2000.

(51) Int. Cl.
| C10G 17/06 | (2006.01) |
| C10G 15/00 | (2006.01) |
| C09K 8/64 | (2006.01) |
| C09K 8/82 | (2006.01) |

(52) U.S. Cl. ............ 507/260; 507/269; 166/244.1; 166/308.4; 208/14; 208/15; 208/18; 208/106; 208/263; 208/265; 208/266; 208/281; 208/282

(58) Field of Classification Search .......... 507/103, 507/203
See application file for complete search history.

(56) References Cited

U.S. PATENT DOCUMENTS

| 1,761,328 A | * | 6/1930 | Chappell | 208/263 |
| 2,358,004 A | * | 9/1944 | Dressler et al. | 530/207 |
| 2,396,646 A | * | 3/1946 | Dressler et al. | 530/207 |
| 2,568,738 A | * | 9/1951 | Kirkpatrick et al. | 516/180 |
| 2,952,634 A | * | 9/1960 | Lolkema et al. | 507/138 |
| 2,996,450 A | * | 8/1961 | Zech et al. | 507/110 |
| 3,095,368 A | * | 6/1963 | Hartzband et al. | 208/252 |
| 3,169,113 A | * | 2/1965 | Kirkpatrick et al. | 507/240 |
| 3,707,459 A | | 12/1972 | Mason et al. | 208/76 |
| 3,796,266 A | | 3/1974 | Carlin et al. | 166/305 R |
| 3,804,760 A | | 4/1974 | Darley | 252/8.55 R |
| 4,012,329 A | * | 3/1977 | Hayes et al. | 507/135 |
| 4,085,799 A | | 4/1978 | Bousaid et al. | 166/272 |

(Continued)

FOREIGN PATENT DOCUMENTS

| EP | 0175511 | 6/1988 |
| WO | WO 01/81718 | 11/2001 |

*Primary Examiner*—Randy Gulakowski
*Assistant Examiner*—John J Figueroa
(74) *Attorney, Agent, or Firm*—Adam P. Brown

(57) ABSTRACT

The invention describes a method for decreasing the viscosity of crude oils and residuum utilizing a combination of thermal and acidic treatment. Further, the invention describes a method for making a water-in-oil emulsion, or a solids-stabilized water-in-oil emulsion with a reduced viscosity. The emulsion can be used in enhanced oil recovery methods, including using the emulsion as a drive fluid to displace hydrocarbons in a subterranean formation, and using the emulsion as a barrier fluid for diverting flow of fluids in the formation.

13 Claims, 3 Drawing Sheets

U.S. PATENT DOCUMENTS

| | | | |
|---|---|---|---|
| 4,096,914 A | 6/1978 | McLaughlin et al. | 166/307 |
| 4,216,828 A | 8/1980 | Blair | 166/274 |
| 4,219,082 A | 8/1980 | Kalfoglou | 166/273 |
| 4,298,455 A | 11/1981 | Huang | 208/48 AA |
| 4,384,997 A | 5/1983 | Detroit | 260/124 R |
| 4,411,770 A | 10/1983 | Chen et al. | 208/111 |
| 4,592,830 A | 6/1986 | Howell et al. | 208/94 |
| 4,659,453 A | 4/1987 | Kukes et al. | 208/108 |
| 4,790,382 A | 12/1988 | Morrow et al. | 166/274 |
| 4,795,478 A * | 1/1989 | Layrisse R. et al. | 44/301 |
| 5,095,986 A | 3/1992 | Naae et al. | 166/274 |
| 5,294,353 A * | 3/1994 | Dill | 507/269 |
| 5,350,014 A | 9/1994 | McKay | 166/263 |
| 5,603,863 A * | 2/1997 | Dahms | 424/401 |
| 5,820,750 A | 10/1998 | Blum et al. | 208/263 |
| 5,855,243 A | 1/1999 | Bragg | 166/275 |
| 5,891,262 A * | 4/1999 | Khalil et al. | 134/22.11 |
| 5,910,467 A * | 6/1999 | Bragg | 507/202 |
| 5,927,404 A * | 7/1999 | Bragg | 166/275 |
| 6,022,471 A | 2/2000 | Wachter et al. | 208/120 |
| 6,068,054 A * | 5/2000 | Bragg | 166/270 |
| 6,387,840 B1 * | 5/2002 | Salazar et al. | 502/170 |
| 6,410,488 B1 | 6/2002 | Fefer et al. | 507/103 |
| 6,544,411 B2 | 4/2003 | Varadaraj | 208/265 |
| 6,734,144 B2 * | 5/2004 | Varadaraj et al. | 507/103 |
| 6,800,193 B2 * | 10/2004 | Varadaraj | 208/106 |
| 2001/0049902 A1 * | 12/2001 | Varadaraj et al. | 44/301 |
| 2002/0011022 A1 * | 1/2002 | Nishida et al. | 44/301 |

* cited by examiner

MINERAL ACID ENHANCED THERMAL TREATMENT FOR VISCOSITY REDUCTION OF OILS (ECB-0002)

REFERENCE TO RELATED APPLICATIONS

This application is a divisional of Application Ser. No. 09/819,269, filed Mar. 28, 2001, now U.S. Pat. No. 6,800,193 which claims the benefit of U.S. Provisional Application No. 60/199,565 filed Apr. 25, 2000.

FIELD OF THE INVENTION

The present invention relates to a method for reducing the viscosity of crude oils and crude oil residuum by mineral acid enhanced thermal treatment of crude oil or crude oil residuum. The product from the combination of acid and thermal treatment process affords oil with a substantially lower viscosity than the starting oil or product oil derived from thermal treatment without acid addition.

Thus, the instant process provides an improved visbreaking method and can be utilized as an upgrading process in pipeline transportation, or to reduce the viscosity of a water-in-oil emulsion used in enhanced oil recovery (EOR) operations.

BACKGROUND OF THE INVENTION

Technologies for viscosity reduction of heavy crude oils and resids are of importance to the upstream and downstream petroleum businesses respectively. In downstream refining operations, visbreaking and hydro-visbreaking (visbreaking with hydrogen addition) of resids are known in the art and practiced commercially. In the upstream production operations, crude oil dilution with gas condensate and emulsification technologies using caustic and water are some of the commonly practiced art in pipeline transportation of heavy oils e.g., bitumen. Moreover, viscosity reduction of heavy crude oils can play a role in new upstream technology related to recovering hydrocarbons from subterranean formations using enhanced oil recovery methods. There is a continuing need in the oil industry for technologies and technology improvements relating to viscosity reduction of crude oils and resids.

The depletion of reserves containing high quality crude oil, and the accompanying rise in costs of high quality crude oil has producers and refiners of petroleum looking to heavy crude oil reserves as a source for petroleum. There are many untapped heavy crude oil reserves in a number of countries including Venezuela, Chad, Russia, the United States and elsewhere. However, these heavy crude oils, because of their high viscosity and poor flow properties, pose significant challenges to producers, transporters and refiners of oil. Heavy crude oils are often difficult if not impossible to extract from subterranean formations in an efficient and cost-effective manner. Further, even when the heavy crude is extracted, the poor flow characteristics of the crude oil present additional complications in pumping, transporting and refining the crude oil.

Processes have been developed to aid in extracting the heavy crude from underground reservoirs. For instance, a new process has recently been developed which aids in extracting heavy crude oil from a subterranean formation, which uses solids-stabilized emulsions as a driver fluid or as a barrier fluid to help recover hydrocarbons from the subterranean formation. These methods are generally discussed in U.S. Pat. Nos. 5,927,404, 5,910,467, 5,855,243, and 6,068,054. U.S. Pat. No. 5,927,404 describes a method for using the novel solids-stabilized emulsion as a drive fluid to displace hydrocarbons for enhanced oil recovery. U.S. Pat. No. 5,855,243 claims a similar method for using a solids-stabilized emulsion, whose viscosity is reduced by the addition of a gas, as a drive fluid. U.S. Pat. No. 5,910,467 claims the novel solids-stabilized emulsion described in U.S. Pat. No. 5,855,243. U.S. Pat. No. 6,068,054 describes a method for using the novel solids-stabilized emulsion as a barrier for diverting the flow of fluids in the formation. In a solids-stabilized emulsion, the solid particles interact with the surface-active components in the water and crude oil to enhance the stability of the emulsion. The process is simple in that the emulsion is made by simply mixing oil, typically crude oil from the reservoir itself, with micron or sub-micron sized solid particles and mixing with water or brine until the emulsion is formed. The process is also cheap in that all of these materials should be readily available at the reservoir site.

Solids-stabilized water-in-oil emulsions have a viscosity that is greater than that of the crude oil to be recovered, and as such, can serve as an effective drive fluid to displace the crude oil to be recovered, such as described in U.S. Pat. Nos. 5,927,404, and 5,855,243.

The solids-stabilized water-in-oil emulsions can also be used as a barrier fluid, to fill in subterranean zones of high rock permeability, or "thief zones." When drive fluid is injected into a reservoir, the injected drive fluid may channel through these zones to producing wells, leaving oil in other zones relatively unrecovered. A high viscosity barrier fluid, such as the solids-stabilized water-in-oil emulsion, can be used to fill these "thief zones" to divert pressure energy into displacing oil from adjacent lower-permeability zones.

However, sometimes the solids-stabilized water-in-oil emulsion is too viscous to be injected or is too viscous to otherwise be efficiently used as a drive or barrier fluid. Therefore, there is a need to be able to reduce the viscosity of the emulsion to obtain the optimum rheological properties for the type of enhanced oil recovery method used and for the particular type and viscosity of crude oil to be recovered Viscosity reduction of heavy oils is also important for downstream operations. Transporters and refiners of heavy crude oil have developed different techniques to reduce the viscosity of heavy crude oils to improve its pumpability. Commonly practiced methods include diluting the crude oil with gas condensate and emulsification with caustic and water. Thermally treating crude oil to reduce its viscosity is also well known in the art. Thermal techniques for visbreaking and hydro-visbreaking are practiced commercially. The prior art in the area of thermal treatment or additive enhanced visbreaking of hydrocarbons teach methods for improving the quality, or reducing the viscosity, of crude oils, crude oil distillates or residuum by several different methods. For example, several references teach the use of additives such as the use of free radical initiators (U.S. Pat. No. 4,298,455), thiol compounds and aromatic hydrogen donors (EP 175511), free radical acceptors (U.S. Pat. No. 3,707,459), and hydrogen donor solvent (U.S. Pat. No. 4,592,830). Other art teaches the use of specific catalysts such as low acidity zeolite catalysts (U.S. Pat. No. 4,411,770) and molybdenum catalysts, ammonium sulfide and water (U.S. Pat. No. 4,659,453). Other references teach upgrading of petroleum resids and heavy oils (Murray R. Gray, Marcel Dekker, 1994, pp.239-243) and thermal decomposition of naphthenic acids (U.S. Pat. No. 5,820,750).

A common thread that knits the various methods previously described is a need to obtain optimum viscosity reduction in oil.

SUMMARY OF THE INVENTION

It is this aspect of enhancing viscosity reduction that this invention addresses. Provided is a method of reducing the viscosity of oil or a water-in-oil emulsion by an acid enhanced thermal treatment process. The product from the acid enhanced thermal treatment process has a substantially lower viscosity than the untreated oil or the untreated water-in-oil emulsion, respectively.

An embodiment of the invention is directed to a method for decreasing the viscosity of crude oils and residuum comprising the steps of:

(a) contacting the crude oil or residuum with an effective amount of an acid consisting essentially of acid, (b) heating said crude oil or crude oil residuum and said acid at a temperature and for a time and at a pressure sufficient to decrease the viscosity of said crude oil or residuum.

As used herein, crude oil residuum is defined as residual crude oil obtained from atmospheric or vacuum distillation.

As used herein, the process comprises, consists and consists essentially of the steps herein described.

Another embodiment of the process is directed to a thermal visbreaking method for reducing the viscosity of crude oils and crude oil residuum by thermally treating the oils and residuum wherein the improvement comprises contacting the crude oil or residuum with an effective amount of an acid consisting essentially of or consisting of acid and heating said crude oil or residuum and said acid at a temperature and for a time and at a pressure sufficient to decrease the viscosity of said crude oil or residuum.

The invention is also directed to a crude oil or crude residuum having decreased viscosity prepared by (a) contacting the crude oil or residuum with an effective amount of an acid consisting essentially of acid, (b) heating said crude oil or residuum and said acid at a temperature and for a time and at a pressure sufficient to decrease the viscosity of said crude oil or residuum Another embodiment of the invention is directed to a method of preparing a water-in-oil emulsion with a decreased viscosity comprising the steps of:

(a) contacting the oil with acid, (b) heating said oil and said acid at a temperature and for a time and at a pressure sufficient to decrease the viscosity of said oil, and (c) adding water and mixing until said water-in-oil emulsion is formed.

A solids-stabilized emulsion having a reduced viscosity may also be made using this method by adding solid particles to the oil after the step of heating the acid treated oil (step b), but before emulsification by adding water and mixing (step c).

DETAILED DESCRIPTION OF THE INVENTION

Figure 1A:
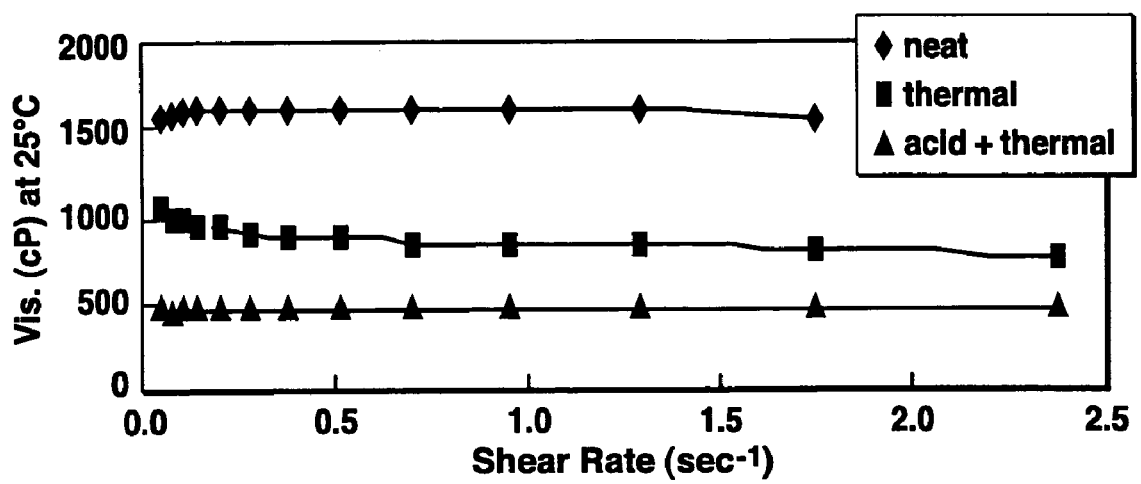
FIGS. 1A and 1B are viscosity versus shear rate plots for the untreated and thermally treated T and K crude oils at 25° C. The X axis is Shear rate (sec$^{-1}$) and the Y axis is viscosity (cP). The line with diamonds is the untreated crude oil. The line with squares is heat treatment alone. The line with triangles is the acidic heat treatment combination described herein.

According to the invention, there is provided an improved method for viscosity reduction of crude oils and crude oil residuum. An acid is added to the crude or residuum followed by thermal treatment at temperatures of about 250 to about 450° C. at about 30 to about 300 psi for about 0.25 to 6 hours in an inert environment.

Typically, the amount of acid added will be about 10 to about 1000 ppm, preferably about 20 to 100 ppm, based on the amount of crude oil or crude oil residuum.

Preferably, the acid utilized in the contacting step will not contain other components not inherent in the acid itself or not present in the acid as impurities. Thus, preferably, the acid will consist essentially of or consist of acid.

In the instant invention, one skilled in the art can choose process conditions to retain or degrade naphthenic acids in addition to reducing the viscosity of the crude. For example, to degrade the naphthenic acids a purge gas is used as disclosed in U.S. Pat. No. 5,820,750. Any inert purge gas (a gas non-reactive in the process) may be used. For example nitrogen, argon, etc.

Interestingly, the instant invention allows for acid addition to crude oils which are high in naphthenic acids to achieve viscosity reduction. Such an addition of acid to acidic crude oil is counter intuitive since refiners are continuously looking for methods which reduce the amount of acid in crude oils and residuum.

The types of acids which can be utilized in the instant invention include mineral acids such as sulfuric acid, hydrochloric acid and perchloric acid. Organic acids like acetic, para-toluene sulfonic, alkyl toluene sulfonic acids, mono di and trialkyl phosphoric acids, organic mono or di carboxylic acids, formic, C3 to C16 organic carboxylic acids, succinic acid, & low molecular weight petroleum naphthenic acid are also effective in this invention. Mixtures of mineral acids, mixtures of organic acids or combinations of mineral and organic acids may be used to produce the same effect. The preferred mineral acid is sulfuric or hydrochloric acid. The preferred organic acid is acetic acid. Nitric acid should be avoided since it could potentially form an explosive mixture.

Reaction time, temperature and pressure collectively define process severity. One ordinarily skilled in the art can choose process severity within the preferred ranges to produce the desired level of viscosity decrease.

Though not wishing to be bound, applicants believe that the acid enhanced thermal treatment alters the molecular aggregation properties of associating chemical species.

Viscosity Reduction of a Water-in-Oil Emulsion Using Acid Enhanced Thermal Treatment The previously described method for reducing the viscosity of oil can be used to make a water-in-oil emulsion or a solids-stabilized water-in-oil emulsion with a reduced viscosity. The viscosity of the oil is reduced by the method previously described, prior to using the oil to make the emulsion. Though any decrease in the viscosity of the oil can be beneficial, preferably the viscosity will be decreased by at least about 2 to 30 times that of the viscosity of the oil prior to the treatment described herein.

To make a water-in-oil emulsion with a reduced viscosity using this method, water or brine is added to the acid enhanced thermally treated oil. The water or brine is added in small aliquots or continuously with mixing, preferably at a rate of about 500 to about 12000 rpm, for a time sufficient to disperse the water as small droplets in the continuous oil phase, thereby forming the emulsion. The amount of water in the emulsion water can range from 40 to 80 wt %, preferably 50 to 65 wt %, and more preferably 60 wt %. Preferably, formation water is used to make the emulsion, however, fresh water can also be used and the ion concentration adjusted as needed to help stabilize the emulsion under formation conditions. The resulting emulsion will have a substantially lower viscosity than an emulsion made with an untreated oil, or an oil subjected only to thermal treatment.

A solids-stabilized water-in-oil emulsion with a reduced viscosity can also be made using the acid enhanced thermal treatment process described above. The solids particles may be added to the oil before or after the acid addition and thermal treatment step, but should be added before adding water and emulsifying. However note that if the solid particles are present during the thermal treatment step, the solid particles have the potential for fouling the process equipment, and this issue needs to be addressed to practice this embodiment. Accordingly, it is preferred to add the solids particles to the oil after the acid and thermal treatment steps.

The solid particles preferably should be hydrophobic in nature. A hydrophobic silica, sold under the trade name Aerosil® R 972 (product of DeGussa Corp.) has been found to be an effective solid particulate material for a number of different oils. Other hydrophobic (or oleophilic) solids can also be used, for example, divided and oil-wetted bentonite clays, kaolinite clays, organophilic clays or carbonaceous asphaltenic solids.

The individual solid particle size should be sufficiently small to provide adequate surface area coverage of the internal droplet phase. If the emulsion is to be used in a porous subterranean formation, the average particle size should be smaller than the average diameter of pore throats in the porous subterranean formation. The solid particles may be spherical in shape, or non-spherical in shape. If spherical in shape, the solid particles should preferably have an average size of about five microns or less in diameter, more preferably about two microns or less, even more preferably about one micron or less and most preferably, 100 nanometers or less. If the solid particles are non-spherical in shape, they should preferably have an average size of about 200 square micron total surface area, more preferably about twenty square microns or less, even more preferably about ten square microns or less and most preferably, one square micron or less. The solid particles must also remain undissolved in both the oil and water phase of the emulsion under the formation conditions. The preferred treat rate of solids is 0.05 to 0.25 wt % based upon the weight of oil.

The resulting water-in-oil emulsion or solids-stabilized water-in-oil emulsion's pH can be adjusted by adding a calculated amount of weak aqueous base to the emulsion for a time sufficient to raise the pH to the desired level. If the pH of the emulsion is too low (less than 4), it may be desirable to adjust the emulsion's pH to the 5 to 7 range. Adjusting the pH is optional as in some cases it is desirable to inject an acidic emulsion and allow the reservoir formation to buffer the emulsion to the reservoir alkalinity.

Ammonium hydroxide is the preferred base for pH adjustment. Stronger bases like sodium hydroxide, potassium hydroxide and calcium oxide have a negative effect on emulsion stability. One possible explanation for this effect is that strong bases tend to invert the emulsion, i.e. convert the water-in-oil emulsion to an oil-in-water emulsion. Such an inversion is undesirable for the purposes of this invention.

The water-in-oil emulsion or the solids-stabilized water-in-oil emulsion can be used in a wide range of enhanced oil recovery applications. One typical application is using such an emulsion for displacing oil from a subterranean formation, i.e. using the emulsion as a drive fluid. The emulsion is prepared, as described above, and then injected into the subterranean formation, typically, but not necessarily through an injection well. The emulsion, which is injected under pressure, is used to displace the oil in the formation towards a well, typically a production well, for recovery.

This application is related to U.S. application Ser. No. 09/819,269, filed Mar. 28, 2001, now allowed, which is hereby incorporated herein by reference.

Another application is for using the emulsion as a barrier fluid to divert the flow of hydrocarbons in a subterranean formation. Again, the emulsion is prepared and then injected into the subterranean formation. The emulsion is used fill "thief zones" or to serve as a horizontal barrier to prevent coning of water or gas. As previously explained, "thief zones" and coning events will reduce the efficiency of enhanced oil recovery operations.

The present invention has been described in connection with its preferred embodiments. However persons skilled in the art will recognize that many modifications, alterations, and variations to the invention are possible without departing from the true scope of the invention. Accordingly, all such modifications, alterations, and variations shall be deemed to be included in this invention, as defined by the appended claims.

The following examples are included herein for illustrative purposes and are not meant to be limiting.

EXAMPLES

In a typical experiment 200 g of the crude oil was placed in a Parr autoclave and 10 to 50 ppm of sulfuric acid was added to the crude oil and mixed for 10 minutes at 25° C. The sulfuric acid treated crude oil was purged with an inert gas like nitrogen for 30 minutes, autoclave sealed under nitrogen and the contents heated to 360° C. for 2 to 6 hours at pressures ranging from 90 to 280 psi. It is to be noted that thermal treatment was conducted in the absence of a continuous sweep of inert gas. In the absence of an inert sweep gas, viscosity reduction without significant TAN reduction is expected.

After completion of experiment, the treated crude was analyzed for a) total acid number (TAN) and molecular weight distribution of the naphthenic acids b) heptane insolubles c) toluene equivalence and viscosity determined at 20, 25, 30, 35 and 40° C. in a shear range of 0.1 to 2.5 sec$^{-1}$.

RESULTS

Examples 1 and 2: (Crude Oils)

Tables 1 & 2 summarize the effect of thermal treatment and sulfuric acid catalyzed thermal treatment on key properties of T and K crude oils respectively. As can be seen from the data no significant changes are observed in the total acid number, distribution of naphthenic acids, toluene equivalence and n-heptane insolubles between the thermally treated and sulfuric acid catalyzed thermally treated samples. These data indicate that the chemistry of the crude oil is not significantly altered as a result of sulfuric acid addition prior to thermal treatment.

Figure 1B:
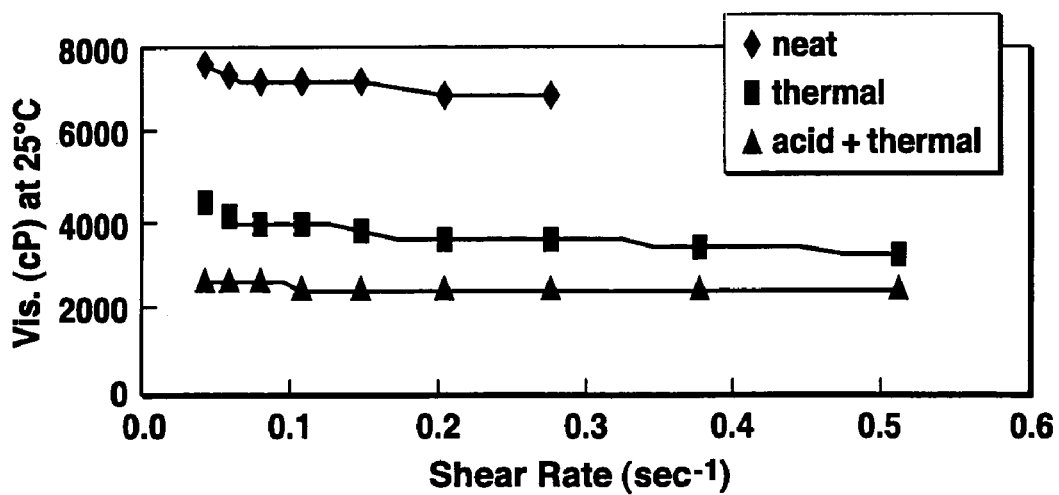

Viscosity as a function of shear rate plots for the untreated and thermally treated T and K crude oils are shown on FIGS. 1A and 1B. Data are plotted for the neat crude, thermally treated crude and thermally treated crude with prior sulfuric acid addition. A reduction in viscosity as a result of thermal treatment is expected. However, it is observed that sulfuric acid addition prior to thermal treatment results in further reduction in viscosity.

Figure 2A:
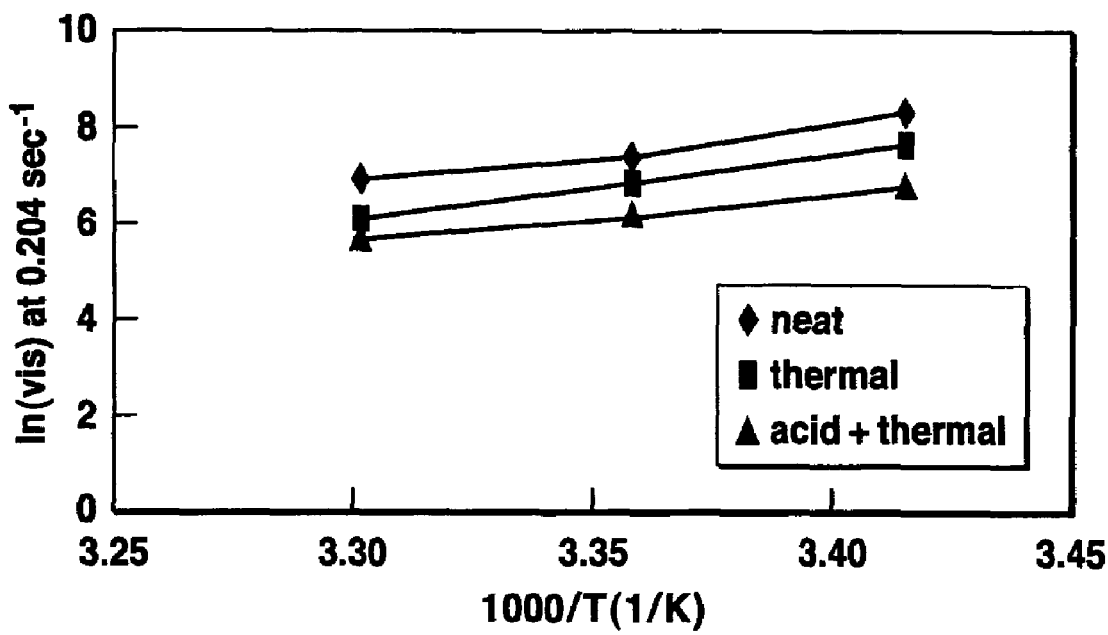
FIGS. 2A and 2B depict viscosity versus temperature plots for the untreated and thermally treated T and K crude oils. The X axis is temperature 1000/T(1/K) and the Y axis is viscosity (cp.) expressed as ln(vis) @0.204 sec$^{-1}$. The line with diamonds is the untreated crude oil. The line with squares is heat treatment alone. The line with triangles is the acidic heat treatment combination described herein.
Figure 2B:
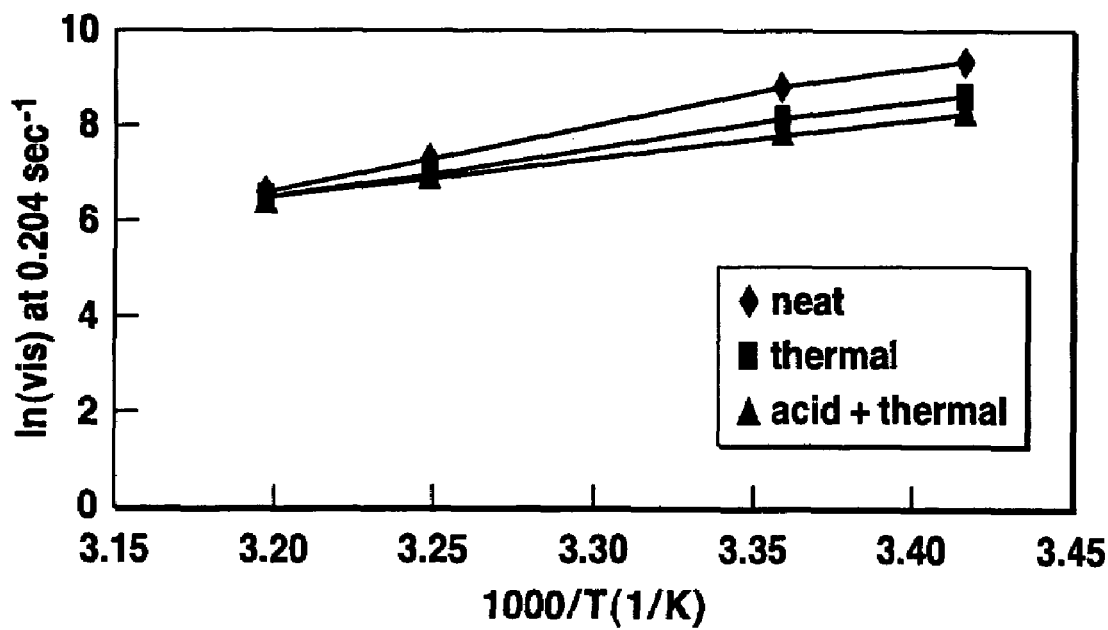

Viscosity at 0.204 sec $^{-1}$ as a function temperature plots for the untreated and thermally treated T and K crude oils are shown on FIGS. 2A and 2B. Data are plotted for the neat crude, thermally treated crude and thermally treated crude with prior sulfuric acid addition. From the slope of each plot the corresponding energy of activation was calculated. A decrease in energy of activation is observed for samples subjected to sulfuric acid addition and thermal treatment relative to thermal treatment without prior acid addition. This suggests that sulfuric acid catalyzed thermal treatment has altered fundamental aggregation properties of the chemical species responsible for high viscosities of respective heavy crude oils.

Example 3 (Vacuum Resid)

Figure 3:
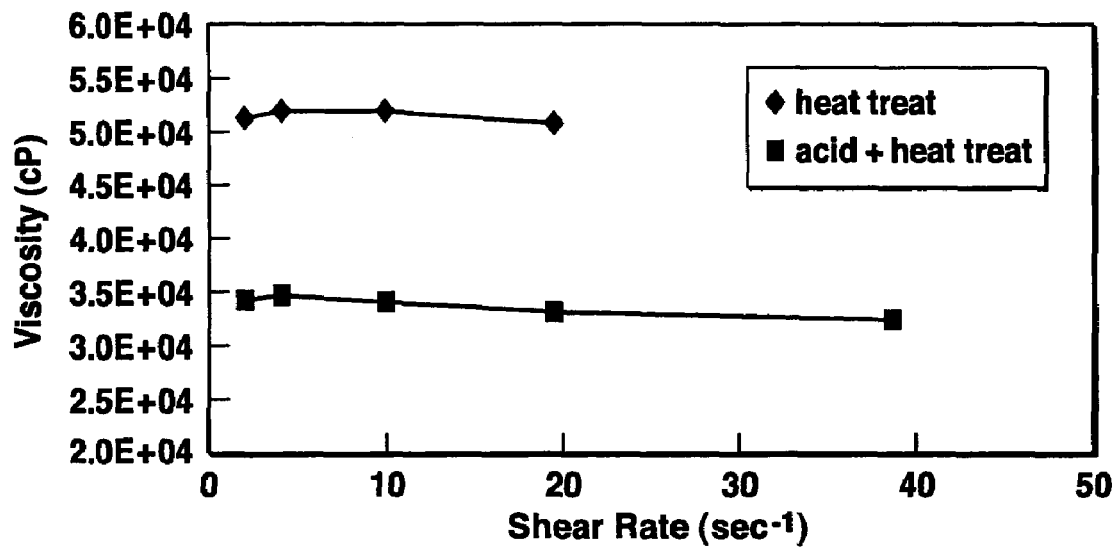
FIG. 3 depicts viscosity versus shear rate plots for a heavy vacuum resid at 60° C. The X axis is Shear rate (sec$^{-1}$) and the Y axis is viscosity (cP). The line with diamonds is heat treatment alone. The line with squares is the acidic heat treatment combination described herein.
Figure 4:
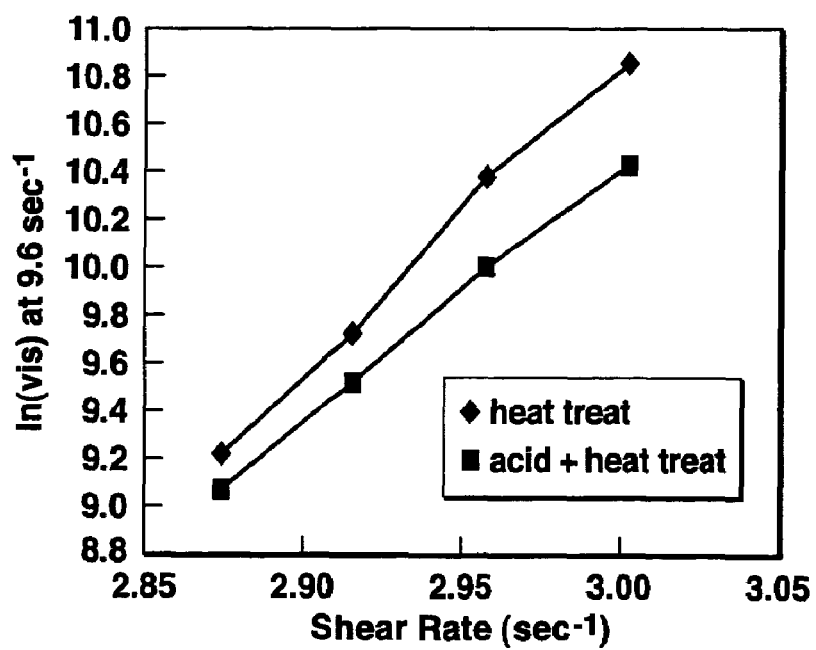
FIG. 4 depicts viscosity versus temperature plots for a heavy vacuum resid. The X axis is temperature 1000/T(1/K) and the Y axis is viscosity (cP) expressed as ln(vis) @ 9.6 sec$^{-1}$. The line with diamonds is heat treatment alone. The line with squares is the acidic heat treatment combination described herein.

Corresponding data for Arab Heavy Vacuum Resid are shown on FIGS. 3 and 4. Results indicate that the mineral acid enhanced thermal process for resids produces product oil that is substantially decreased in viscosity compared to thermal treatment in absence of mineral acid.

TABLE 1

Thermal Treatment of Crude Oil T

| Property | Treatment Conditions | | | |
|---|---|---|---|---|
| | None | 10 ppm $H_2SO_4$ | 360° C./6 hrs/ 280 psi/$N_2$ | (360° C./6 hrs/ 280 psi/$N_2$) 10 ppm $H_2SO_4$ |
| Total Acid Number (titration) | 6.1 | 6.1 | 3.9 | 4.1 |

| Acid distribution (micromoles nap acid/g crude) | | | | |
|---|---|---|---|---|
| 250 MW | 61.47 | | 44.83 | 40.35 |
| 300 MW | 32.80 | | 24.01 | 21.71 |
| 400 MW | 8.20 | | 5.78 | 5.05 |
| 450 MW | 19.07 | | 14.03 | 12.12 |
| 600 MW | 10.49 | | 8.48 | 7.32 |
| 750 MW | 8.33 | | 8.07 | 7.54 |
| n-heptane Insolubles % | 2.6 | 2.7 | 2.7 | 2.7 |
| Toluene Equivalence | 14 | 14 | 31 | 31 |

TABLE 2

Thermal Treatment of Crude Oil K

| Property | Treatment Conditions | | |
|---|---|---|---|
| | None | 360° C./6 hrs/ 280 psi/$N_2$ | (360° C./6 hrs/ 280 psi/$N_2$) 10 ppm $H_2SO_4$ |
| Total Acid Number (titration) | 4.2 | 3.2 | 3.8 |

TABLE 2-continued

Thermal Treatment of Crude Oil K

| Acid distribution (micromoles nap acid/g crude) | | | |
|---|---|---|---|
| 250 MW | 16.55 | 13.99 | 14.27 |
| 300 MW | 15.75 | 11.33 | 13.73 |
| 400 MW | 4.12 | 2.85 | 3.56 |
| 450 MW | 25.02 | 17.72 | 21.78 |
| 600 MW | 23.06 | 18.42 | 21.09 |
| 750 MW | 22.96 | 18.85 | 20.94 |
| n-heptane Insolubles % | <0.1 | <0.1 | 0.9 |
| Toluene Equivalence | 0 | 0 | <5 |

What is claimed is:

1. A method for preparing a water-in-oil emulsion comprising the steps of:
  (a) providing one of a crude oil or a crude oil residuum (oil)
  (b) adding acid to said oil at a treat rate of about 10 to 1,000 parts per million to generate an acid enhanced oil, wherein said acid consists essentially of acid;
  (c) thermally treating the acid enhanced oil at a temperature of about 250° C. to about 450° C. and for a time and at a pressure sufficient to decrease the viscosity of said oil to generate a heat treated acid enhanced oil, wherein said pressure is about 30 pounds per square inch (psi) to about 300 psi; and
  (d) adding water to said heat treated acid enhanced oil and mixing until said water-in-oil emulsion is formed.

2. The method of claim 1, wherein said acid comprises at least one of mineral acid, organic acid, mixtures of at least two mineral acids, mixtures of at least two organic acids or mixtures of at least one mineral acid and at least one organic acid.

3. The method of claim 1, wherein said step of heating said oil is conducted for times of about 0.15 hours to about 6 hours.

4. The method of claim 1, wherein said method further comprises the addition of solid particles to said oil prior to said step of adding water and mixing to form said emulsion.

5. The method of claim 4, wherein said solid particles are added at a treat rate of about 0.05 wt % to about 0.25 wt % based upon the weight of said oil.

6. The method of claim 1, further comprising adjusting the pH of said water-in-oil emulsion using a weak aqueous base.

7. The method of claim 1, further comprising:
  (d) injecting said emulsion into a subterranean formation; and
  (e) recovering hydrocarbons from said subterranean formation using said emulsion.

8. The method of claim 7, wherein said acid comprises at least one of mineral acid, organic acid, mixtures of at least two mineral acids, mixtures of at least two organic acids or mixtures of at least one mineral acid and at least one organic acid.

9. The method of claim 7, wherein said step of heating said oil is conducted for times of about 0.15 hours to about 6 hours.

10. The method of claim 7, wherein said method further comprises the addition of solid particles to said oil prior to said step of adding water and mixing to form said emulsion.

11. The method of claim 10, wherein said solid particles are added at a treat rate of about 0.5 wt % to about 0.25 wt % based upon the weight of said oil.

12. The method of claim 7, wherein said water-in-oil emulsion is used as a drive fluid to displace hydrocarbons in said subterranean formation.

13. The method of claim 7, wherein said water-in-oil emulsion is used as a barrier fluid to divert the flow of hydrocarbons in said subterranean formation.

* * * * *